UNITED STATES PATENT OFFICE

ORIN D. CUNNINGHAM, OF INDIANAPOLIS, INDIANA, ASSIGNOR TO PETER C. REILLY, OF INDIANAPOLIS, INDIANA

PROCESS OF FROTH FLOTATION

No Drawing. Application filed November 7, 1929, Serial No. 405,547. Renewed February 19, 1931.

My present invention relates to the recovery of minerals, such as sulfide ores and the like, by the froth flotation process and the invention has for its object the use of a certain class of organic substances, namely organic phosphites, as collecting agents in the concentration of such ores and minerals.

By the term "organic phosphites" I refer particularly to compounds of the type $P(OR)_3$, where R stands for an alkyl, aryl, alkaryl or aralkyl radical; a class of compounds that may be regarded as esters of phosphorous acid of the structure $P(OH)_3$.

It has been found that organic phosphites possess the general property of modifying the surface of the mineral particles of a finely ground ore, so as to make the ore more amenable to flotation, the reagents possessing such property being termed "flotation collecting agents".

The organic phosphites may be made in any suitable manner; one convenient and efficient method consisting in the reaction of phosphorus trichloride with an organic hydroxy compound as illustrated by the following type equation:

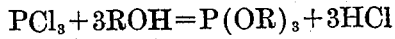
$$PCl_3 + 3ROH = P(OR)_3 + 3HCl$$

where R stands for an alkyl, aryl, alkaryl or aralkyl group. In order to prevent the reaction products entering into certain side reactions it is preferable to carry out this reaction under conditions wherein the hydrogen chloride (HCl) produced in the reaction, is removed either by volatilization or by neutralization.

The above type of reaction is in general applicable to many organic hydroxy compounds, as for example, ethyl alcohol, the propyl alcohols, the butyl alcohols, the cresols, the xylenols, and benzyl alcohol; to form respectively triethyl phosphite, tripropyl phosphites, tributyl phosphites, tricresyl phosphites, trixylenyl phosphites, and tribenzyl phosphite. Mixtures of such hydroxy compounds could, of course, be similarly used, or the metal derivatives thereof.

As specific examples, the following methods are given for preparing the organic phosphites of the invention, but without intending to restrict the invention thereto:—

*Example 1.*—4.2 gms. of phosphorus trichloride was slowly added to 10.0 gms. of osocrel at 150° C. with agitation, the total time for carrying out the reaction being one-half hour.

Under these conditions the hydrogen chloride formed was immediately separated from the reaction mixture by volatilization, thereby avoiding complicating side reactions with the tricresyl phosphite. A measurement of the hydrogen chloride formed showed the theoretical for the reaction according to the type equation given above.

Or, as another method of eliminating the hydrogen chloride from the sphere of further reaction, it may be neutralized, as illustrated by the following example.

*Example 2.*—4.2 gms. of phosphorus trichloride was added slowly to 11.0 gms. of a cresylic acid solution of sodium cresylate at 100–110° C. with agitation, the reaction time being one half hour. The sodium cresylate used in the reaction mixture corresponded to 65% of the theory to neutralize the theoretical hydrogen chloride formed according to the above type equation for the formation of organic phosphites.

It is evident that the sodium cresylate content of the above reaction mixture may be varied, to suit the needs of the reaction, between the limits zero and 100% of the theory to neutralize the hydrogen chloride formed.

Or, in place of sodium cresylate, potassium cresylate may be used, or an organic base such as pyridine.

The tricresyl phosphite reaction products thus obtained were used directly for flotation.

*Example 3.*—2.1 gms. of phosphorus trichloride (in 5 c. c. of ether) was slowly added to a mixture of 20.0 c. c. of ether, 2.1 gms. of absolute ethanol and 3.6 gms. of pyridine at 0° C. with agitation, the total reaction time being one half hour. The reaction mixture was then filtered to separate the pyridine hydrochloride which precipitated out and the ether solution filtrate then evaporated in a vacuum desiccator to free the triethyl phosphite reaction product from the ether solvent used in its preparation.

In carrying out the above preparation, as well as others herein cited, it is absolutely essential to use anhydrous materials and to work under conditions to exclude the absorption of moisture from the air.

Instead of pyridine to neutralize the hydrogen chloride, sodium ethanolate may be used or other alkali or alkaline earth salt.

The above examples illustrate the general method of preparation of the organic phosphite class of flotation reagents according to this invention and they will serve as examples for carrying out this type of reaction with closely related organic hydroxy compounds, such as for example, the propyl alcohols, the butyl alcohols, the amyl alcohols, the mixed higher alcohols (fusel oil) phenol, the cresols, the xylenols, the tar acids from coal tars, benzyl alcohol and hydrogenated aromatic compounds such as hexahydro-phenol, the hexahydrocresols, etc.

The organic phosphites of this invention, such as those illustrated in this invention, were employed as collecting reagents in the flotation of Utah Copper Company copper sulfide ore (1.0% copper), in the ratio (for example) of 0.05–0.10 pound per ton of dry ore, with pine oil as a frothing agent, and a lime circuit being employed therewith. The ore was subjected to the ordinary flotation operation in a Janney flotation machine and a tailing analyzing about 0.10% copper was obtained together with a high grade concentrate, corresponding to a recovery of about 90% of the copper value in the ore.

These products were further tested as to their flotation activity by the Gates-Jacobsen flotation method which involves the use of 50.0 gms. of a pure mineral such as chalcocite, galena, etc. in a regular froth flotation operating, employing a miniature Janney flotation cell; (see Eng. Mining Journal Vol. 119, page 77, May 9, 1925). They showed a very superior flotation activity by this method.

The flotation reagents of this invention can be used on ores in general, and larger or smaller amounts of the reagents may be used than above specified, depending on the type of ore and other conditions. Any suitable frothing agent can be used for example, cresylic acid and risor rosin oil, instead of pine oil. Furthermore, their use is not limited to any type of flotation cell. Instead of an alkaline circuit as used in the above, a neutral or acid circuit may be employed.

I claim:—

1. In the froth flotation of metalliferous material, the herein described process which comprises subjecting the said material to flotation in the presence of a compound having the general formula $P(OR)_3$ in which R represents an alkyl, aryl, aralkyl or alkaryl group.

2. In the art of concentrating by froth flotation, the step of floating material in the presence of an organic phosphite of an alcohol containing not more than five carbon atoms.

3. In the art of concentrating by froth flotation, the step of floating material in the presence of an organic phosphite of a phenol.

4. In the art of concentrating by froth flotation, the step of floating material in the presence of an organic phosphite of tar acids.

5. In the art of concentrating by froth flotation, the step of floating material in the presence of an organic phosphite of a hydrogenated phenol.

In testimony whereof I have signed my name to this specification.

ORIN D. CUNNINGHAM